United States Patent [19]

Zettler et al.

[11] Patent Number: 5,560,245
[45] Date of Patent: Oct. 1, 1996

[54] MOISTURE ACTIVATED WIPER SENSOR

[75] Inventors: Gerard J. Zettler, Winona, Minn.; Michael A. Niver, Onalaska, Wis.

[73] Assignee: Lake Center Industries, Inc., Winona, Minn.

[21] Appl. No.: 283,035

[22] Filed: Jul. 29, 1994

[51] Int. Cl.$^6$ .................................................. G01N 21/00
[52] U.S. Cl. ........................................................ 73/335.01
[58] Field of Search ........................... 73/170.17, 335.01; 250/341.8, 349

[56] References Cited

U.S. PATENT DOCUMENTS

| | | | |
|---|---|---|---|
| 4,701,613 | 10/1987 | Watanabe et al. | 250/341.8 |
| 4,798,956 | 1/1989 | Hochstein | 250/349 |
| 4,859,867 | 8/1989 | Larson et al. | 250/349 |
| 4,871,917 | 10/1989 | O'Farrell et al. | 250/349 |
| 4,960,996 | 10/1990 | Hochstein | 250/349 |
| 4,973,844 | 11/1990 | O'Farrell et al. | 250/341.8 |

*Primary Examiner*—Richard Chilcot
*Assistant Examiner*—Ronald L. Biegel
*Attorney, Agent, or Firm*—Dorn, McEachran, Jambor & Keating

[57] ABSTRACT

A moisture activated wiper sensor has all necessary electronic and optical components for detecting moisture and performing signal processing in a single module which mounts to a vehicle windshield. The packaging of the optical components and associated electronic circuitry in an acceptably small housing is achieved by use of insert-molded lenses and infrared emitters and detectors mounted on separate printed circuit boards called wing boards. Wing board supports molded into the housing assure proper orientation of the wing boards relative to the lenses. Flexible cables connect the wing boards to a main circuit board.

15 Claims, 1 Drawing Sheet

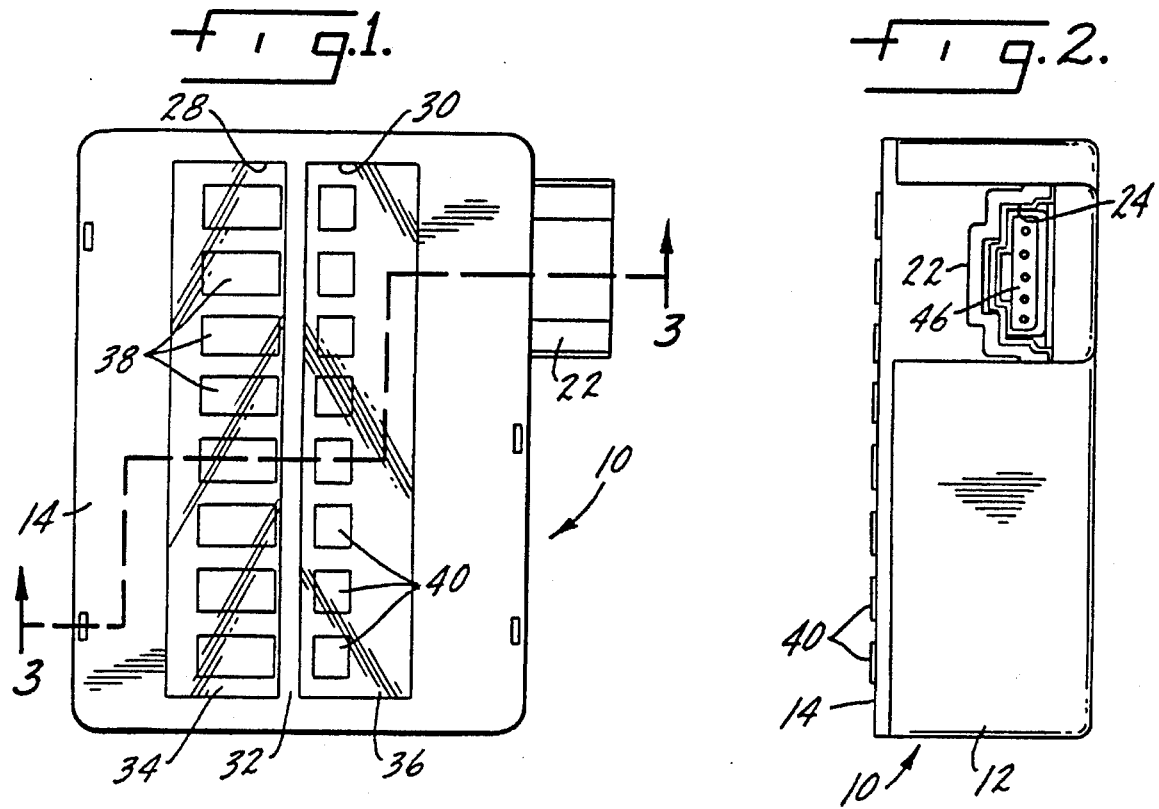
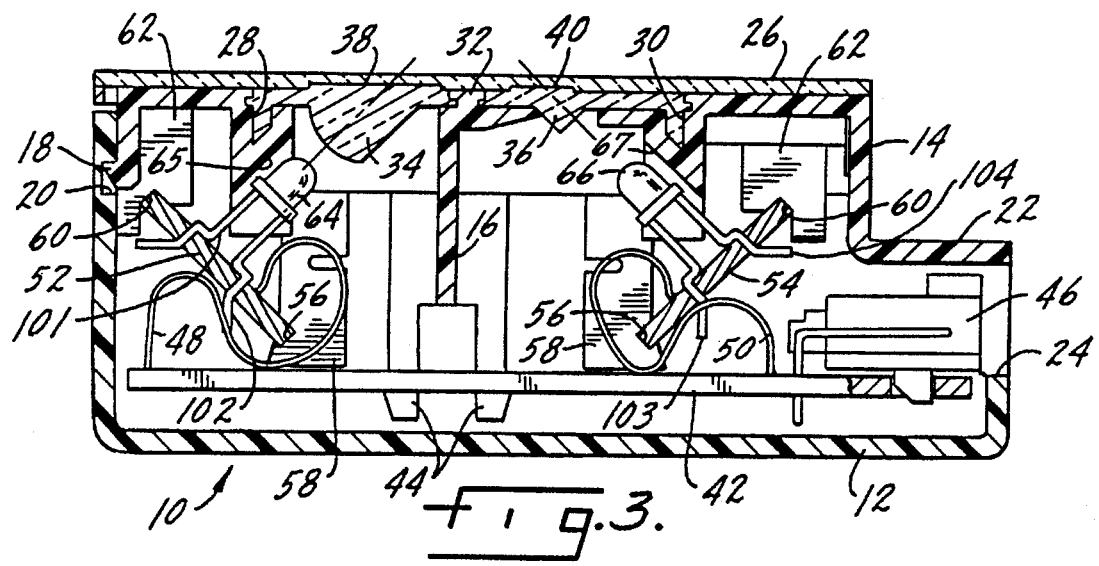

MOISTURE ACTIVATED WIPER SENSOR

BACKGROUND OF INVENTION

This invention relates to moisture activated windshield wiper controls. Controls of this type typically include an optical sensor aimed at a vehicle windshield and electronic circuitry for processing signals from the optical sensor to detect the presence of water droplets on the windshield. The output of the processing circuit controls the wiper motor at a variable speed governed by the amount of water on the windshield. Controls of this type are shown in Teder, U.S. Pat. No. 5,059,877, the disclosure of which is incorporated by reference.

Prior art moisture activated wiper controls use two separate modules to perform the rain detecting and signal processing functions. The first module contains the optical elements for emitting light toward the windshield and collecting the reflected light. This module is mounted on the windshield in the vehicle interior, usually behind a rear view mirror. Since the alignment of the light emitters and collectors is critical to successful moisture detection, the first module has been relatively bulky to assure proper alignment of the optical elements. As a result, there has been no room in the first module for the associated processing Circuitry which creates the wiper motor control signal. Accordingly, the electronic circuitry for processing signals from the light collectors has been housed in a separate, second module. Again due to the size of the first module, the second module has been located remote from the first module, usually somewhere in the vehicle dash. This dual module design with the remote location of the processing circuitry module complicates installation, service and repair, adding to the cost of the system. It also requires wiring the two modules together, further adding to the overall cost.

SUMMARY OF THE INVENTION

This invention concerns a moisture sensor for applications such as moisture-activated wiper control systems. A primary object of the invention is a moisture sensor for a wiper control system having moisture sensing and signal processing functions performed in a single module attached to a windshield.

Another object of the invention is a moisture sensor of the type described having insert-molded lenses.

Another object is a moisture sensor using separate printed circuit boards called wing boards for mounting infrared emitters and photo-detectors.

A further object of the invention is a moisture sensor having a housing with molded wing board supports which assure proper orientation of the wing boards relative to the lenses.

Still another object of the invention is a wiper control circuit board using surface mount electronics throughout, including the use of bottom side surface mount components to allow for greater circuit density.

Yet another object of the invention is a wiper control circuit board wherein the main board and wing boards are made as a homogeneous unit with autoinsertable infrared emitters and detectors.

These and other objects which may become apparent are realized by a moisture sensor for a moisture-activated wiper control system having a single module for both moisture sensing and signal processing. Moisture sensing is done with infrared emitters directed through a collimating lens toward the windshield and infrared photo-detectors collecting light reflected from the windshield through a receiver lens. The lenses are insert-molded in a housing to assure accurate alignment and to give the smallest possible lens assembly. The signal processing is performed by circuitry placed on a main circuit board in the housing. The emitters and detectors are mounted on wing boards, which are separate from the main circuit board. The wing boards are held in known, fixed relation to the lenses by supports molded into the housing.

BRIEF DESCRIPTION OF THE INVENTION

FIG. 1 is a plan view of the moisture sensor of the present invention.

FIG. 2 is a side elevation View of the moisture sensor.

FIG. 3 is a section taken along line 3—3 of FIG. 1.

DETAILED DESCRIPTION OF THE INVENTION

The moisture sensor of the present invention is shown in FIGS. 1–3. All of the optical and electrical components for generating a control signal responsive to the amount of moisture on a windshield are located within a housing 10. The housing has a case 12 and a cover 14 which define a generally hollow interior. The interior is separated into optically isolated compartments by a partition 16 depending from the cover. The case and cover preferably snap together. Hooks 18 formed in the cover engage notches 20 in the case (FIG. 3) to retain the housing pieces together. A socket 22 protrudes from one side of the housing. The socket has an opening 24 for receiving a plug-in connector of a signal and power cable (not shown). For reference purposes only, the housing is about 25 mm thick, 55 mm wide without the socket (65 mm wide including the socket) and about 71 mm long. The housing may be fixed to a windshield or other surface by optically clear, double-sided tape, shown at 26 in FIG. 3.

The upper surface of the cover has first and second window openings 28 and 30 defined therein. These window openings are separated by a rib 32. A collimator lens 34 is insert-molded into the first window opening 28 while a receiver lens 36 is insert-molded into the second window opening 30. Insert-molded lenses are used to produce the smallest possible lens assembly. Briefly, insert-molding is a method wherein a component, in this case the lenses, is placed in the mold and plastic is directly molded around it to secure it in place. In addition to being a space conserving insert-molding is also very accurate when compared with alternative methods such as snapping in place or heat staking. This is particularly critical in the present invention since proper detection of moisture demands correctly aligned light emitters, detectors and their associated lenses.

The lenses 34, 36 are molded of plastic which is colored to pass infrared light. The collimator lens 34 collimates light from the emitters while the receiver lens 36 focuses reflected light onto the detectors. Moisture droplets on the windshield affect the amount of light reflected which allows their presence to be differentiated from their absence. The lenses 34, 36 include a plurality of upraised areas 38 and 40. The purpose of the upraised areas is to prevent entrapment of air bubbles underneath the mounting tape at the critical locations of the lenses. The upraised areas are located at the points where light will exit or enter the lenses. Since these are the highest points of the lenses, when the tape is applied it will contact those areas first, causing air bubbles, if any, to be pushed to non-critical portions of the lenses.

Details of the interior of the housing can be seen in FIG. 3. A main printed circuit board assembly 42 is supported on ledges 44 formed near the base of the case 12. The printed circuit board includes the electronic circuit components necessary for controlling the optical components, for interpreting the signals therefrom and for generating a control signal. The board 42 includes a portion which extends into the housing socket 22 to support an electrical connector 46. The connector receives through opening 24 a cable which connects the sensor to a power source and the wiper motor in the vehicle. The printed circuit board 42 also has soldered thereto two 3-conductor flex cables 48 and 50. These cables provide electrical connection between the printed circuit board 42 and the two wing boards 52 and 54.

Wing boards 52 and 54 are mounted in the case 12, each within its own pair of slots 56 formed in feet 58. The slots 56 are arranged to receive the lower edge of the wing board. The upper edge of the wing boards is trapped in notches 60 formed in braces 62. Braces 62 and feet 58 depend from the top surface of the cover 14, at the front and rear edges thereof. Thus, there are two braces and two feet for each wing board. Together the slots 56 and notches 60 define wing board supports which mount the boards at a 45° angle to the horizontal. Because the configuration of the wing board supports can be carefully controlled during molding, the orientation of the wing boards is predetermined and fixed.

The wing board 52 has attached to it a plurality of infrared emitters 64. Similarly, wing board 54 carries an equal number of photo-detectors 66 in the form of photo-transistors. Using inserts 101–104, both the emitters and detectors are preferably autoinserted on the wing boards. By using standard autoinsertion equipment with preformed emitters and detectors the assembly is smaller and more cost effective to manufacture. Also, this process assures the components will be mounted perpendicular to the wing board. Since the wing board orientation is fixed as described above, the emitters and detectors will accordingly be properly directed with respect to the lenses 34 and 36.

The illustrated embodiment contemplates eight sets of emitters and photo-transistors but a different number could be used. For example, four sets of emitters and photo-transistors have been found sufficient in some applications. Whatever the number of emitter and photo-transistor pairs, it is preferred that each device be disposed within its own pocket. The pockets are arcuate enclosures that help optically isolate or shield each device from its neighbor. Thus, each emitter 64 resides in its own pocket 65 (FIG. 3). The pocket is formed in a wall depending from the cover 14, at the left edge of the window opening 28 as seen in FIG. 3. Similarly, a wall at the right edge of window opening 30 defines a plurality of arcuate pockets 67, one pocket for each photo-detector 66.

Electrical connections to the wing boards are made by the flex cables 48 and 50. The flex cables are attached as by soldering during construction of the boards. It is preferred that the wing boards and main printed circuit board be built as a single, homogeneous unit, including installation of the flex cables. Upon completion of installation of all components the wing boards are separated from the main board for snap-in installation in the housing case as shown.

It can be seen that the wing boards eliminate the need for any additional parts to align the optical components. Optical alignment is built into the housing. This provides a compact package that has room for the electronic circuit needed to process the signals from the photo-detectors. This single module is easy to install with only one electrical connection needed to the wiper system. In addition, the single module of the present invention has field service benefits in terms of reduced part stocking requirements at the dealer and simplicity in diagnosing a failure.

While a preferred form of the invention has been shown and described, it will be realized that alterations and modifications may be made thereto without departing from the scope of the following claims. For example, instead of using a separate main printed circuit board, somewhat larger wing boards might be used with parts of the processing circuits on each board, in addition to the optical components thereon.

We claim:

1. A moisture sensor, comprising:

a housing having first and second wing printed circuit board supports formed therein and first and second window openings defined in the housing;

collimator and receiving lenses mounted in the housing, the collimator lens directing light out the first window opening and the receiving lens receiving light in through the second window opening;

a first wing printed circuit board mounted in the first wing printed circuit board supports at a desired, fixed relation to the collimator lens determined by the first wing printed circuit board supports and a second wing printed circuit board mounted in the second wing printed circuit board supports at a desired, fixed relation to the receiving lens determined by tho second wing printed circuit board supports;

a plurality of light emitters mounted on the first wing printed circuit board in a fixed predetermined relation thereto for directing light to the collimator lens, the emitters having rigid inserts the emitter in a fixed, predetermined relation to the first wing printed circuit board; and a plurality of photo-detectors mounted on the second wing printed circuit board in a predetermined relation thereto for detecting light from the receiving lens, the photo-detectors having rigid inserts attached in a fixed, predetermined relation to the second wing printed circuit board.

2. The moisture sensor of claim 1 wherein the lenses are disposed in the window openings.

3. The moisture sensor of claim 1 wherein the processing circuitry is mounted on a main circuit board in the housing and further comprising connector means for electrically connecting the wing printed circuit boards to the main circuit board.

4. The moisture sensor of claim 3 wherein the connector means comprises a flexible cable for each wing printed circuit board.

5. The moisture sensor of claim 3 further comprising an electrical connector attached to the main circuit board.

6. The moisture sensor of claim 3 wherein the housing includes supports for the main circuit board.

7. The moisture sensor of claim 1 wherein the housing further comprises a partition disposed between the emitters and photo-detectors to optically isolate them in the interior of the housing.

8. The moisture sensor of claim 1 wherein the housing comprises upper and lower portions defining a generally hollow interior for receiving the wing printed circuit boards and processing circuitry.

9. The moisture sensor of claim 1 wherein the housing includes a plurality of pockets for receiving the emitters and photo-detectors.

10. A moisture sensor, comprising:

a housing having at least one wing printed circuit board support formed therein and first and second window openings defined in the housing;

collimator and receiving lenses mounted in the housing, the collimator lens directing light out the first window opening and the receiving lens receiving light in through the second window opening;

at least one wing printed circuit board mounted in the wing printed circuit board support at a desired, fixed relation to one of the collimator or receiving lens; and a plurality of optical components including light emitters and photo-detectors, at least one of said components being mounted on the wing printed circuit board and having rigid inserts used to mount the components in a fixed, predetermined relation to the wing printed circuit board.

11. A moisture sensor for attachment to a windshield, comprising:

a housing having a cover with at least one window opening defined therein;

a main circuit board mounted in the housing and spaced from the cover;

at least one wing printed circuit board mounted in the housing in a desired, fixed relation to the window opening;

a plurality of optical components including light emitters and photo-detectors, one of said components being mounted on the wing printed circuit board, the components being mounted to the wing printed circuit board by rigid insert which provide the only mechanical support for the components.

12. The sensor of claim 11 further characterized in that there are first and second wing printed circuit boards mounted in the housing in a desired, fixed relation to one another, the light emitters being attached to the first wing printed circuit board by rigid inserts which provide the only mechanical support for the emitters and the photo-detectors being attached to the second wing printed circuit board by rigid inserts which provide the only mechanical support for the photo-detectors.

13. The sensor of claim 11 further characterized in that the wing printed circuit board is disposed between the main circuit board and the cover.

14. The sensor of claim 11 further comprising a lens structure disposed in the window opening.

15. The sensor of claim 11 further comprising wing printed circuit board supports formed in the housing for mounting the wing printed circuit board in a predetermined orientation.

* * * * *